United States Patent
Gorinevsky et al.

(10) Patent No.: US 7,103,507 B2
(45) Date of Patent: Sep. 5, 2006

(54) STRUCTURE HEALTH MONITORING SYSTEM AND METHOD

(76) Inventors: Dimitry Gorinevsky, 281 El Verano Ave., Palo Alto, CA (US) 94306; Grant A. Gordon, 22421 N. 81 Ave., Peoria, AZ (US) 85383; Joseph Nutaro, 2228 E. North La., Phoenix, AZ (US) 85028

(*) Notice: Subject to any disclaimer, the term of this patent is extended or adjusted under 35 U.S.C. 154(b) by 0 days.

(21) Appl. No.: 10/952,995

(22) Filed: Sep. 28, 2004

(65) Prior Publication Data
US 2006/0069520 A1    Mar. 30, 2006

(51) Int. Cl.
*G06F 11/30* (2006.01)
*G01B 3/44* (2006.01)

(52) U.S. Cl. ............ 702/184; 702/34; 701/29
(58) Field of Classification Search .......... 702/29, 702/34, 184; 701/29
See application file for complete search history.

(56) References Cited

U.S. PATENT DOCUMENTS

| | | | |
|---|---|---|---|
| 5,329,465 A | | 7/1994 | Arcella et al. |
| 5,452,438 A | * | 9/1995 | Umeda et al. .......... 714/1 |
| 6,370,957 B1 | | 4/2002 | Filippenko et al. |
| 2002/0038199 A1 | * | 3/2002 | Blemel .......... 702/183 |
| 2003/0167616 A1 | | 9/2003 | Harding et al. |

FOREIGN PATENT DOCUMENTS

WO    WO 03/054503 A2    7/2003

OTHER PUBLICATIONS

PCT International Search Report PCT/US2005/034434 filed May 22, 2006.

* cited by examiner

*Primary Examiner*—John Barlow
*Assistant Examiner*—Cyndy D. Khuu
(74) *Attorney, Agent, or Firm*—Ingrassia Fisher & Lorenz (57) ABSTRACT

A structure health monitoring ("SHM") system according to the invention can be deployed in an onboard environment, such as an aircraft, to provide an ongoing damage assessment of structural components on the aircraft. The SHM system reduces or eliminates time consuming and costly manual inspections of aircraft. The SHM system can leverage known sensor technologies to collect sensor data indicative of the structural health of the monitored components. The sensor data is processed and baselined with sensor feature baselines and damage estimate baselines to provide an accurate final damage estimate for the monitored component. The final damage estimate can be further processed or formatted for compatibility with aircraft maintenance systems.

16 Claims, 5 Drawing Sheets

STRUCTURE HEALTH MONITORING SYSTEM AND METHOD

TECHNICAL FIELD

The present invention generally relates to structure health monitoring systems, and more particularly relates to a structure health monitoring system configured for deployment in an aircraft.

BACKGROUND

Certain vehicles, buildings, watercraft, and other structures may be subjected to periodic physical inspections that monitor the health of various components within the structures. For example, commercial aircraft may be routinely inspected to confirm, for example, structural integrity. Structural inspections of commercial aircraft are usually performed manually and, therefore, can be labor intensive and costly, especially if a large fleet of aircraft is being maintained. The prior art includes a variety of sensor systems designed to obtain data indicative of potential structural defects. Such systems, however, do not process the sensor data over time for purposes of trending, reporting, forecasting remaining lifetime, and scheduling maintenance. Furthermore, the prior art does not include a "self-contained" onboard structure health monitoring system that can be deployed in an aircraft.

Accordingly, it is desirable to have an onboard structure health monitoring system configured for self contained deployment on an aircraft. In addition, it is desirable to have a structure health monitoring system that processes sensor data over time in connection with damage assessments. Furthermore, other desirable features and characteristics of the invention will become apparent from the subsequent detailed description and the appended claims, taken in conjunction with the accompanying drawings and the foregoing technical field and background.

BRIEF SUMMARY

An onboard structural health monitoring system according to the invention can further improve safety margins and reduce the ownership cost of an aircraft, boat, or vehicle. The system can eliminate manual structural inspections and provide a capability for prognostic determination of remaining lifetime and maintenance scheduling. The above and other aspects of the invention may be carried out in one form by a method for monitoring structural health of an apparatus. The method involves obtaining sensor data indicative of the structural integrity of a component of the apparatus, processing the sensor data to obtain an initial damage estimate for the component, generating a final damage estimate in response to the initial damage estimate and in response to a damage estimate baseline, and formatting the final damage estimate into at least one displayable damage representation.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of diagnostic systems and that the particular implementation described herein is merely one exemplary application for the invention.

For the sake of brevity, conventional techniques related to data sensors, raw sensor data processing, data cleansing, feature extraction, data fusion, data transmission, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 1:
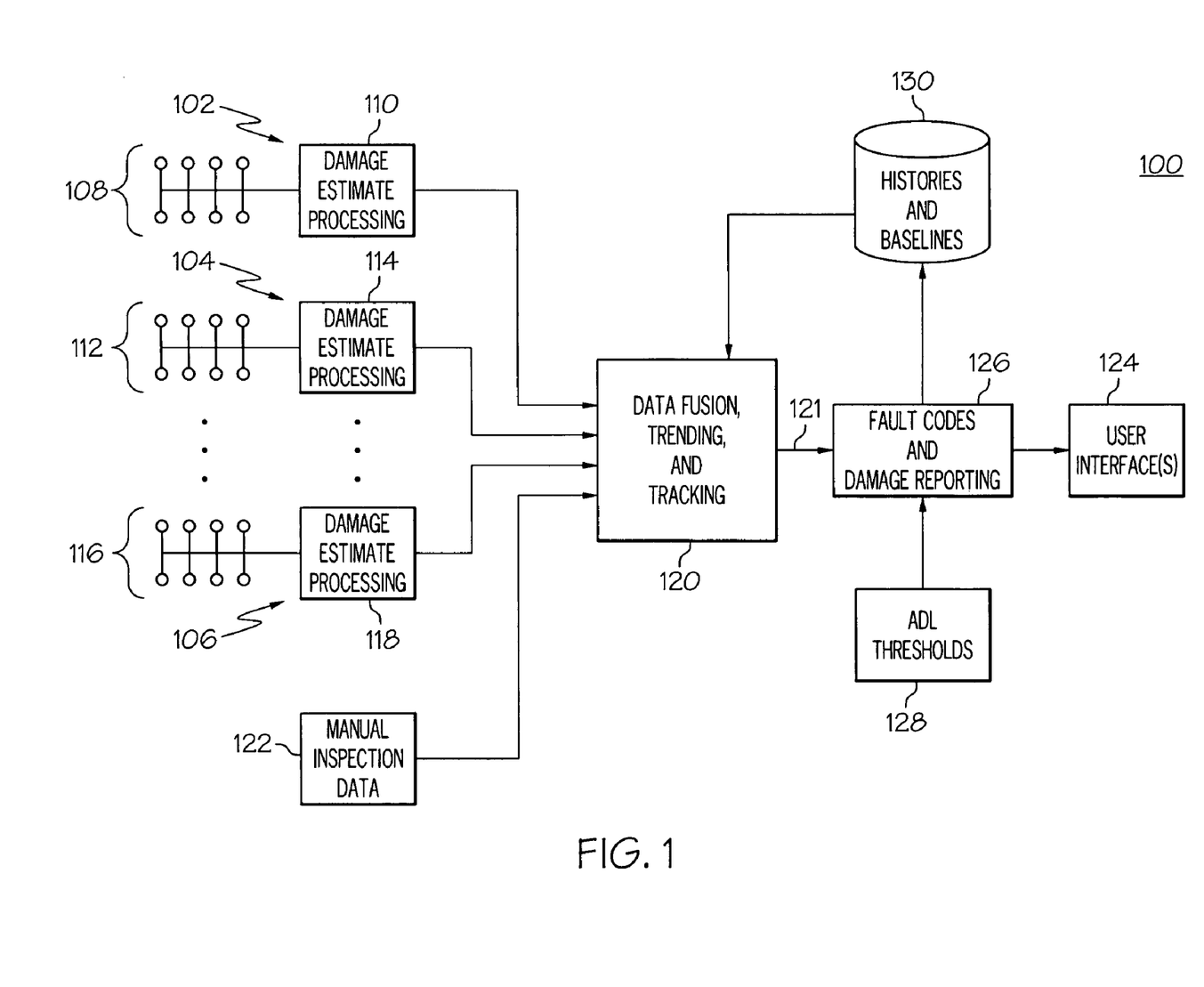
FIG. 1 is a schematic representation of a structure health monitoring system suitable for use with an aircraft.
Figure 2:
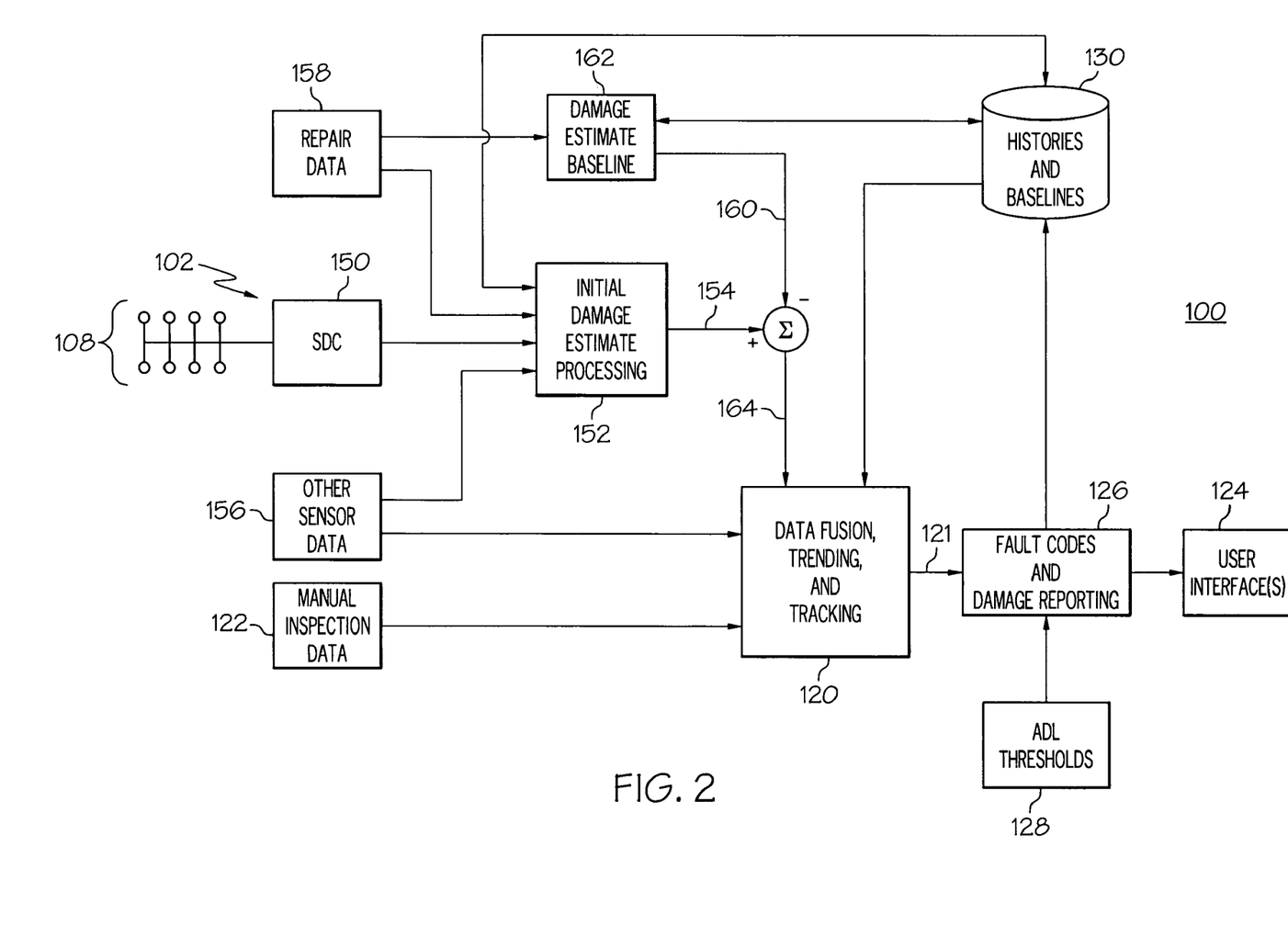
FIG. 2 is a schematic representation of a structure health monitoring system suitable for use with an aircraft.

FIG. 1 depicts a simplified schematic representation of a structure health monitoring ("SHM") system 100 that is suitable for deployment in an apparatus such as an aircraft, an automobile, a building, a watercraft, or the like. FIG. 2 is an alternate representation of SHM system 100 that only depicts one sensor subsystem. A practical embodiment of SHM system 100 may be realized as a "combination" of the elements shown in FIG. 1 and FIG. 2. The example embodiment described herein is deployed in an aircraft such as a commercial airliner. In this regard, the block elements depicted in FIGS. 1 and 2 may represent logical or functional components that can be implemented in any number of hardware devices. For example, elements of SHM system 100 can be incorporated into an existing or new avionics module for deployment in an aircraft. As another example, elements of SHM system 100 can be incorporated into computer modules or any suitable onboard processing architecture of an aircraft.

SHM system 100 is designed to further improve safety margins and reduce the ownership cost for the aircraft by eliminating unnecessary inspections. Costly manual inspections are obviated by an onboard inspection system that provides a path towards prognostic determination of remaining lifetime and maintenance scheduling. A practical embodiment of SHM system 100 can be configured to accommodate the particular application and structure being monitored. For example, the number of sensor subsystems, the sensor types, and the manner in which sensor data is processed may vary from one application to another.

Generally, SHM system 100 is an onboard system that monitors one or more structural components of the aircraft. SHM system 100 employs one or more sensor subsystems configured to gather data indicative of the structural integrity, health, and/or status of the monitored structural components. The sensor data from each sensor subsystem is processed to detect, locate, size, and characterize any damage condition that develops on a structural component. The processed information may be further processed, formatted, and rendered for compatibility with aircraft maintenance systems, diagnostic tools, or user interfaces. SHM system 100 includes at least one database that preferably contains historical data, damage estimate baselines, and sensor feature baselines utilized by SHM system 100 to generate current damage estimates.

SHM system 100 can support any number of sensor subsystems and any number of sensor types. In this regard, FIG. 1 shows a first sensor subsystem 102, a second sensor subsystem 104, and an Nth sensor subsystem 106. A given sensor subsystem can be configured to detect and characterize defects, monitor discrete and continuous loading events and/or environmental conditions associated with the structural component under observation. For example, a sensor subsystem may be configured to detect anomalies that can be related to the structural integrity of an aircraft door made from composite material. Another sensor subsystem may be configured to monitor environmental conditions, such as humidity, and to detect the presence of corrosion in the aircraft galleys. Yet another sensor subsystem may be configured to detect vibrations in critical load supporting structural components. SHM system 100 can employ any suitable sensor type and any suitable sensor subsystem—conventional sensor subsystems known to those skilled in the art can be utilized in the context of SHM system 100. For example, SHM system 100 can employ one or more of the following sensor types, without limitation: ultrasonic guided wave, acoustic emission, electrical resistivity and permittivity, foil and fiber based strain gauges, thermocouples and RTDs, accelerometers, load sensors, or the like.

Each sensor subsystem in SHM system 100 includes at least one sensor that provides raw sensor data, and processing logic for generating an intermediate damage estimate in response to at least the sensor data. Each sensor can be considered to be a means for obtaining sensor data. FIG. 1 depicts a number of sensors 108 and damage estimate processing logic 110 associated with first sensor subsystem 102, a number of sensors 112 and damage estimate processing logic 114 associated with second sensor subsystem 104, and a number of sensors 116 and damage estimate processing logic 118 associated with Nth sensor subsystem 106. In practice, a plurality of sensors for a given sensor subsystem can be mounted to or near the structural component (e.g., surrounding a door or along a load bearing support) and suitably configured to provide the sensor data to the respective damage estimate processing logic. Depending upon the application, the sensors may be coupled to the damage estimate processing logic via wires, cables, physical conduits such as the structure itself, and/or via wireless links or air channels that support a suitable data transmission protocol.

Although not a requirement of SHM system 100, each sensor subsystem typically includes an independent group of similar-type sensors and distinct damage estimate processing logic. In the practical embodiment, the damage estimate processing logic may also process a damage estimate baseline, repair data, other sensor data, or historical data (described in more detail below). Each damage estimate processing logic block shown in FIG. 1 is a simplified representation of the processing that occurs in a practical implementation. Briefly, a damage estimate processing block receives the raw sensor data, samples the incoming raw sensor data, converts the raw sensor data into digital form if necessary, distills or concentrates the sensor data into a manageable form, performs initial processing of the sensor data to determine a preliminary or initial damage estimate for the particular sensor subsystem, and adjusts the initial damage estimate in response to a baseline damage estimate for the particular sensor subsystem. In this regard, the damage estimate processing logic is one example of a means for processing sensor data.

The output of each damage estimate processing logic block is an intermediate damage estimate for the monitored structural component. As used herein, an "intermediate damage estimate" is any non-final representation of a damage estimate. In the example embodiment, intermediate damage estimates are processed internally by SHM system 100 and need not be rendered or displayed to a user or operator. More particularly, an intermediate damage estimate is a damage estimate that has been adjusted to compensate for a baseline or historical damage estimate. The various intermediate damage estimates serve as inputs to a data fusion, trending, and tracking element 120. Thus, data fusion element 120 may receive sensor data for various structural components and combine different types of sensor data (regardless of the source and regardless of the component or event being monitored) to generate a more accurate assessment of the structural health of the specified component.

Data fusion, trending, and tracking element 120 is configured to process the intermediate damage estimates and possibly other data to determine or generate a final damage estimate 121. Data fusion, trending, and tracking element 120 receives damage estimates from one or more structural components and combines these estimates, potentially from different sensor types, to make a more complete damage estimate for the specified component. As described in more detail below, data fusion, trending, and tracking element 120 may process historical data for trending purposes. Accordingly, data fusion, trending, and tracking element 120 is one example of a means for generating a final damage estimate. As used herein, a "final damage estimate" is the resultant damage estimate that SHM system 100 calculates for the particular component. As set forth in more detail below, the final damage estimate data may be further processed, formatted, and/or rendered in a suitable manner for communication to a user via one or more user interfaces 124.

Data fusion, trending, and tracking element 120 may also receive any amount of manual inspection data 122. As used herein, "manual inspection data" is data that has been collected with human labor, as opposed to data that has been collected via an automated system. Although one preferred embodiment of SHM system 100 eliminates the need for manual inspection data, a practical embodiment should be capable of processing such data if it is available. This feature is desirable to enable SHM system 100 to merge manual inspection data 122 with automated sensor data. For example, manual inspection data 122 can be geometrically registered with respect to the structure coordinate system and re-sampled (interpolated) at the spatial grid points corresponding to the automated sensor data collected by SHM system 100 for the monitored component. Data trending techniques might involve establishing and compensating for a drift (error accumulation) between manual inspection data 122 and the intermediate damage estimates. One practical approach employs a Kalman filtering framework to accomplish this goal.

Data fusion, trending, and tracking element 120 is configured to perform any number of suitable data fusion techniques during the processing of the intermediate damage estimates and (optional) manual inspection data 122. Briefly, data fusion, trending, and tracking element 120 processes its input data in an intelligent manner to generate a more complete, and generally more reliable and accurate assessment of the structural health of the monitored component. Data fusion, trending, and tracking element 120 may utilize fundamental techniques that are known to those skilled in the sensor data processing art, including but not limited to: expert system, neural network, and artificial intelligence technologies. Data fusion, trending, and tracking element 120 may also be configured to perform data trending to filter noise from the sensor data and to otherwise enhance the accuracy of final damage estimate 121. For example, data fusion, trending, and tracking element 120 may perform time domain and spatial filtering of the intermediate damage estimates. Data trending functionality may include: (1) smoothing, e.g., providing an accurate estimate of the past history of the damage estimate development; (2) filtering, e.g., computing an accurate noise rejecting estimate of the current structural health state taking into account past history data; and/or (3) prediction, e.g., projecting the damage estimate evolution into the future. The spatial filtering may compute a weighted combination of the various damage estimates at the current point and other spatially close points to provide a more accurate damage estimate at the current point.

In practical embodiments, final damage estimate 121 may be in a format that is unrecognizable by maintenance and/or diagnostic equipment, such as aircraft maintenance systems, personal computers, or the like. Accordingly, final damage estimate 121 may serve as an input to a reporting element 126 that is suitably configured to format final damage estimate 121 into at least one useful representation. For example, reporting element 126 may be configured to format final damage estimate 121 into at least one displayable damage representation for display on a computer terminal, a maintenance terminal, or other user interface 124. Reporting element is one example of a means for formatting the final damage estimate.

In an aircraft deployment, reporting element 126 preferably formats final damage estimate 121 for compatibility with aircraft maintenance systems. In this regard, reporting element 126 may generate fault codes in response to final damage estimate 121 or otherwise convert final damage estimate 121 into one or more fault codes. Reporting element 126 may also process one or more allowable damage limit thresholds 128 in connection with the formatting of final damage estimate 121. As used herein, "allowable damage limit thresholds" are damage thresholds associated with the monitored structural component. Such thresholds are typically provided by the manufacturer of the monitored structure, component, or vehicle. Thus, if the final damage estimate does not exceed a given allowable damage limit threshold, then SHM system 100 need not generate a damage warning.

In a practical aircraft deployment, reporting element 126 can be configured to provide system health information to a central maintenance computer in a predefined format of digital messages indicating faults of the components in the system. In this regard, the entire structure covered by SHM system 100 can be divided into a fixed number of zones. For each zone, a fault will be reported if the damage in the zone exceeds allowable limits and if a structural repair action is required. In addition, damage can be reported in a more detailed manner if requested by a maintenance terminal. This information can be more detailed than fault codes and describe the current state of damage evolution, even if the damage does not trigger the fault code reporting. If only alphanumeric information can be displayed on a given maintenance terminal, then computational logic will translate the key features of the damage estimate array into text messages readable by an operator.

SHM system 100 may include or otherwise communicate with a database 130 of histories and baselines. In FIG. 1, database 130 is shown receiving data from reporting element 126. In a practical embodiment, database 130 may be capable of receiving data from data fusion, trending, and tracking element 120, the sensors, and/or the damage estimate processing logic. Furthermore, as described below, database 130 may be coupled to one or more other elements of a practical SHM system 100. Database 130 stores historical damage data that can be used for future damage assessments or for archival purposes. For example, data fusion, trending, and tracking element 120 communicates with database 130 to obtain history data (which are utilized by the trending and filtering algorithms of data fusion element 120).

FIG. 2 is an alternate representation of SHM system 100. Briefly, FIG. 2 only depicts one sensor subsystem 102, separates the corresponding damage estimate processing logic into a number of elements, and depicts additional communication paths to and from database 130. The above description of elements contained in FIG. 1 also applies to like elements contained in FIG. 2.

In a practical embodiment, raw sensor data for a given sensor subsystem can be gathered by a sensor data concentrator ("SDC") 150, and each sensor subsystem can utilize its own SDC 150. SDC 150 functions to excite active sensors (if applicable), collect raw passive and/or active sensor data, sample the raw sensor data, convert the raw sensor data into digital form if necessary, filter or process the sensor data, and format the sensor data for manageable delivery to an initial damage estimate processing logic element 152. SDC 150 may leverage conventional technologies and SDCs are known to those skilled in the sensor data processing art.

Initial damage estimate processing logic element 152 is suitably configured to process sensor data to obtain an initial damage estimate 154 for the monitored structural component. As used herein, an "initial damage estimate" is any non-final representation of a damage estimate. In the example embodiment, initial damage estimates are processed internally by SHM system 100 and need not be rendered or displayed to a user or operator. More particularly, an initial damage estimate is a damage estimate generated by the sensor subsystem based on the current readings of the sensors and the baseline, and an initial damage estimate need not take into account historical data, data from other sensor subsystems, and auxiliary data (such as manual inspection data). In a practical embodiment, processing logic element 152 can generate initial damage estimate 154 in response to one or more optional pieces of data, including, without limitation: sensor data 156 from other sources such as additional sensor subsystems; repair data 158, which includes sensor repair data and component repair data; and sensor feature baseline data, which may be provided by database 130.

Fundamentally, processing logic element 152 receives the sensor data from SDC 150 and computes an initial estimate of the structural damage or health of the monitored component. Processing logic element 152 may include algorithms developed by the provider of the sensor subsystem, algorithms co-developed by the manufacturer of the monitored structure (e.g., an aircraft manufacturer), or algorithms co-developed by the provider of SHM system 100. In one practical implementation, the main output of processing logic element 152 will be a damage estimate array, where the array elements are estimates of the damage intensity at pre-defined grid points of the monitored structural component. In a typical deployment there might be 200–300 sensors 108 located around the component and perhaps 20,000 grid points for the damage estimation.

Figure 3:
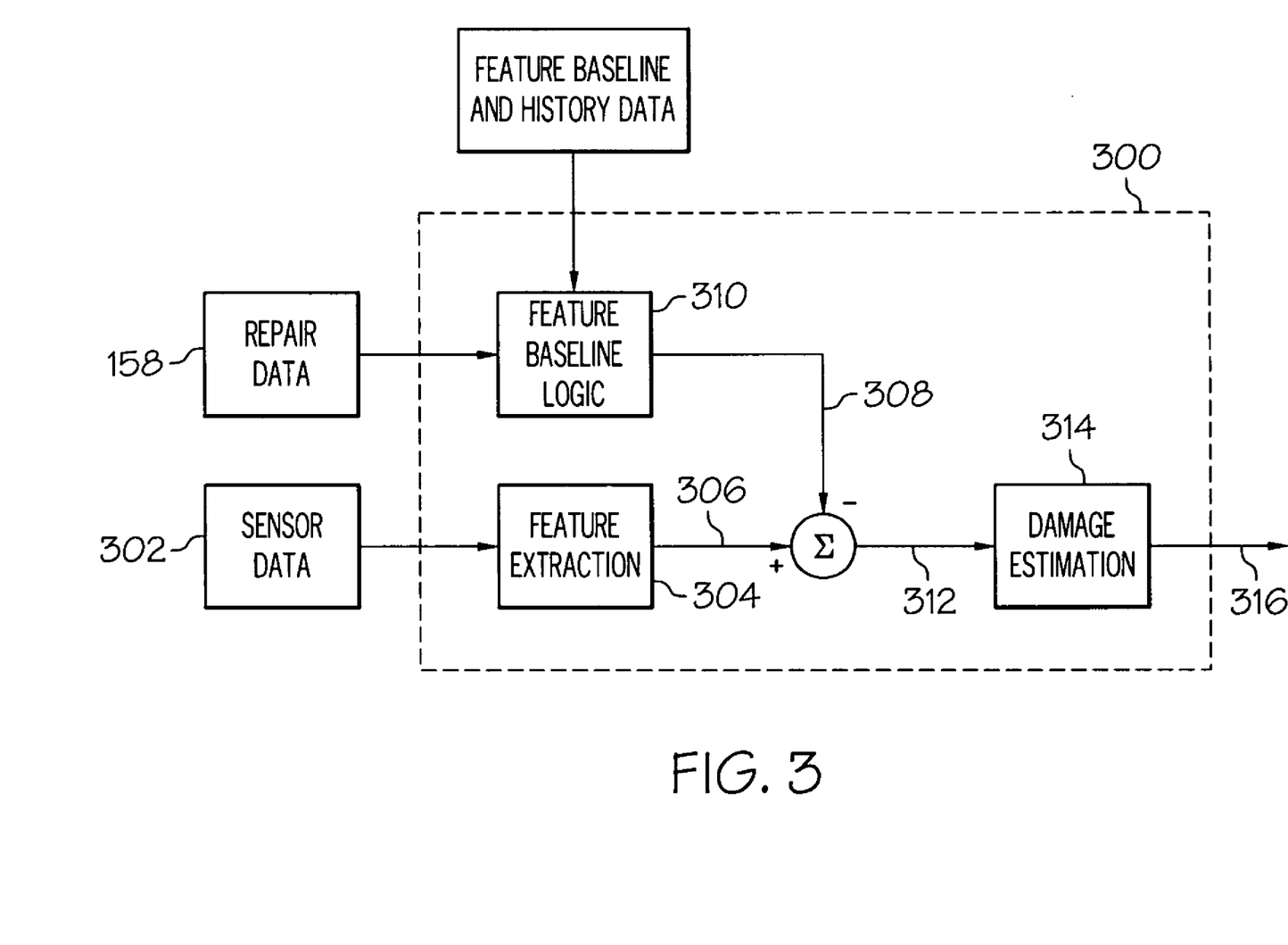
FIG. 3 is a schematic representation of an initial damage estimate processor suitable for use with a structure health monitoring system.

FIG. 3 is a high level schematic representation of an initial damage estimate processor 300 suitable for use with SHM system 100. Processing logic element 152 may utilize processor 300 or some variation thereof. The sensor data 302 is reduced into a set of features by suitably configured feature extraction logic 304. The specific features might differ depending upon the particular application and approach, but typically can be computed using standard and well defined signal processing methods. For example, feature extraction logic 304 may compute time-of-flight, signal amplitude, FFT coefficients, or wavelet coefficients for the collected sensor data 302. The extracted features 306 are then baselined against the nominal state of the monitored structural component. In this regard, a feature baseline 308 (provided by feature baseline processing logic 310) is subtracted from extracted features 306 to obtain baselined features 312. Baselined features 312 are then processed by damage estimation logic 314, which generates the initial damage estimate 316.

An additional input to initial damage estimate processor 300 is repair data 158, which represents repair data for the structural component, sensors 108, SDC 150, or any other component or feature that might have an impact on the calculation of initial damage estimate 316. A recent repair presumes that there is no remaining damage in the structural component and, therefore, indicates a need to reset the feature baseline 308. This ensures that an observed change in the structural behavior of the component is related to damage rather than to a recent repair. Referring again to FIG. 2, feature baseline 308, and historical data related to the operation of initial damage estimate processor 300 can be stored in database 130 and uploaded into initial damage estimate processing logic element 152 when required.

Referring again to FIG. 2, initial damage estimate processing logic element 152 provides only a part of the necessary calculations in the example embodiment. For example, a damage estimate baseline 160 (provided by a damage estimate baseline element 162) is subtracted from initial damage estimate 154 to obtain an intermediate damage estimate 164. Notably, damage estimate baseline 160 is distinct from feature baseline 308 (see FIG. 3) and serves a different purpose. Feature baseline 308 is the reference data acquired at the feature baseline reset time. Feature baseline 308 is used to estimate the damage as a change with respect to the reference state of the component. On the other hand, damage estimate baseline 160 is computed by damage estimate baseline element 162 and is used to ensure a continuity of the baseline estimation in the absence of structural repairs.

As one example, consider replacement of the sensors or analog sensor electronics. Since the sensors are slightly different, this will lead to offsetting damage estimates. In that scenario, feature baseline 308 should be updated to capture a new reference state of the structure. As a result, initial damage estimate 154 will be zero. This new reference state would not in itself account for previous damage, however, since replacing sensors does not change the damage to the monitored component, a suitably configured baseline update logic contained in damage estimate baseline element 162 could be used to compute the new damage estimate baseline 160. This new baseline would be configured in such a way that the new damage estimate is exactly the same as the last damage estimate obtained before the sensor repair. A more advanced possible use of damage estimate baseline 160 would be in the case where there are multiple partial damage spots in addition to a heavier damage spot, which is repaired by applying a local patch. In that case, the baseline should be updated such that the damage estimate is zero in the repair vicinity, while remaining the same elsewhere.

Damage estimate baseline logic 162 may also update damage estimate baseline 160 in response to repair data 158 (e.g., sensor repair data, component repair data, SHM system repair data, or the like) as depicted in FIG. 2. In this context, logic 162 is one example of a means for updating damage estimate baseline 160.

As shown in FIG. 2, database 130 may be coupled to one or more components or logical elements of SHM system 100. As described above, database 130 can receive historical damage data from reporting element 126. Database 130 may be coupled to (or otherwise communicate with) data fusion element 120 to provide such historical data for purposes of trending and/or filtering. Database 130 is also coupled to damage estimate baseline logic element 162 to facilitate the loading of baselines at start-up and the storage of baselines on disk in response to updating. Furthermore, database 130 can be coupled to processing logic element 152 to facilitate the loading of feature baselines at start-up and the storage of such baselines on disk in response to updating.

Database 130 is preferably configured to collect and store the SHM state data, including baselines and histories. In practical embodiments, database 130 can include, without limitation: feature baselines used in connection with the initial damage estimate processing; damage estimate baselines used to obtain the intermediate damage estimates; damage estimate history up to a predefined historical depth (e.g., the last 1000 estimates); fault codes for SHM system 100; text damage reports and their histories; and structural repair data. The SHM data stored in database 130 will be provided to SHM system 100 at restart and when requested by the system. The text report data can also be requested at any time from a maintenance terminal or any suitably deployed user interface. The SHM data stored in database 130 can also be made accessible to external computer devices, networks, or architectures via a wireless link or other suitable data communication channel. The detailed SHM data from database 130 can be used for sustained engineering of SHM system 100 and/or for algorithm maturation (which may apply to initial damage assessment algorithms, data fusion, trending, and tracking algorithms, baseline update algorithms, or the like).

Figure 4:
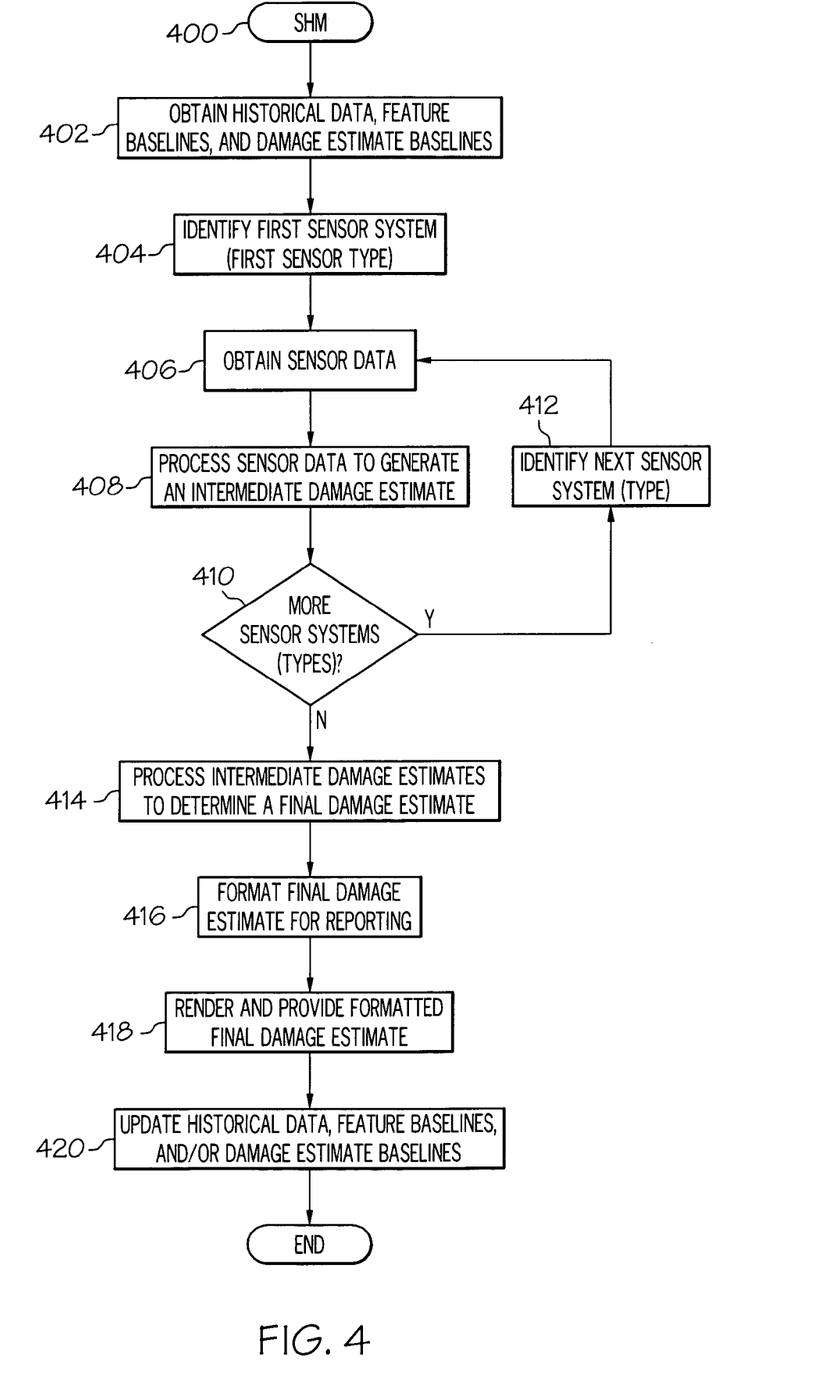
FIG. 4 is a flow diagram of an example structure health monitoring process.

FIG. 4 is a flow diagram of an example SHM process 400 that may be performed by a SHM system, such as SHM system 100 as described herein. Process 400 may be performed and/or controlled by one or more of the logic and/or processor elements described herein. In a practical implementation, process 400 may include any number of additional and/or alternative tasks, and process 400 may be incorporated into a more complex SHM procedure. Furthermore, the tasks depicted in process 400 need not be performed in the order shown in FIG. 4 and one or more of the tasks may be performed concurrently in a practical embodiment.

SHM process 400 can begin by obtaining historical data, feature baselines, damage estimate baselines, and other data at start-up (task 402). As mentioned above, these items can be retrieved from a suitable database and loaded into one or more elements of the SHM system. Task 402 may obtain any number of feature baselines corresponding to any number of sensor subsystems and sensor types. Likewise, task 402 may obtain any number of damage estimate baselines corresponding to any number of sensor subsystems. As described above in connection with FIG. 1, SHM system 100 is capable of processing sensor data from multiple sensor subsystems. Accordingly, SHM process 400 may identify or otherwise begin processing for a first sensor type or subsystem (task 404).

SHM process 400 obtains sensor data for the first sensor subsystem (task 406) and processes that sensor data to generate a corresponding intermediate damage estimate (task 408). An example process for generating intermediate damage estimates is described below in connection with FIG. 5. If there are more sensor subsystems to be polled (query task 410), then SHM process 400 identifies or otherwise begins processing for the next sensor type or subsystem (task 412). Thereafter, SHM process 400 can be re-entered at task 406 such that intermediate damage estimates are obtained for each of the sensor subsystems.

After all of the intermediate damage estimates have been obtained, SHM process 400 processes the intermediate damage estimates as described above to determine a final damage estimate (task 414). The final damage estimate is generated in response to the initial damage estimates, in response to the damage estimate baselines, in response to the intermediate damage estimates, and (optionally) in response to manual inspection data. The final damage estimate can be formatted for reporting (task 416) in any suitable manner and for compatibility with the available diagnostic tools and/or user interfaces. During task 416, the SHM system may process one or more allowable damage limits or thresholds for the monitored components, as described above. In one practical embodiment, the final damage estimate is formatted into at least one displayable damage representation. SHM process 400 can render the formatted final damage estimate into a suitable form and provide the final damage estimate to one or more users (task 418). For example, the final damage estimate can be displayed in a graphical format, displayed in an alphanumeric format, represented as one or more alarms, or the like. SHM process 400 may also update the SHM system database to reflect changes or additions to historical data, feature baselines, and/or damage estimate baselines (task 420).

Figure 5:
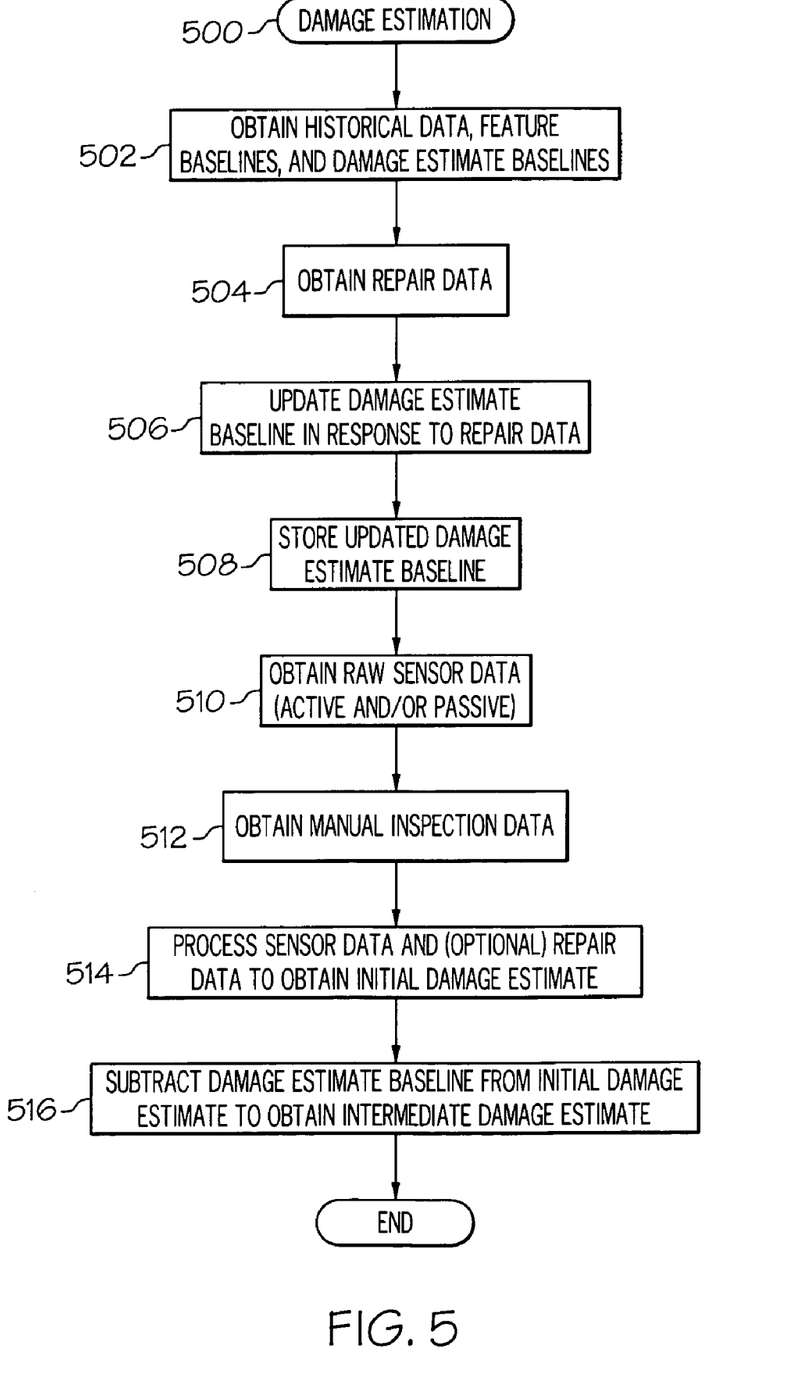
FIG. 5 is a flow diagram of an example damage estimation process.

FIG. 5 is a flow diagram of an example damage estimation process 500 that may be performed by a SHM system, such as SHM system 100 as described herein. Process 500 may be performed and/or controlled by one or more of the logic and/or processor elements described herein. In a practical implementation, process 500 may include any number of additional and/or alternative tasks, and process 500 may be incorporated into a more complex SHM procedure. Furthermore, the tasks depicted in process 500 need not be performed in the order shown in FIG. 5 and one or more of the tasks may be performed concurrently in a practical embodiment.

Briefly, damage estimation process 500 relates to the generation of intermediate damage estimates that can be further processed by SHM system 100 as described above. Process 500 can begin by obtaining historical data, feature baselines, damage estimate baselines, and other data at start-up (task 502). As mentioned above, these items can be retrieved from a suitable database and loaded into one or more elements of the SHM system. If new repair data is available (including, but not limited to, sensor repair data, component repair data, or SDC repair data), then process 500 obtains the repair data (task 504) and updates one or more damage estimate baselines in response to the repair data (task 506). This ensures that SHM system 100 considers changes to the structural component and/or measurement equipment when determining the damage estimates. Any updated damage estimate baselines are preferably stored in database 130 for future reference (task 508).

Once SHM system 100 has been initialized and updated, damage estimation process 500 can obtain raw sensor data, which may be active sensor data and/or passive sensor data for a given sensor subsystem (task 510). Process 500 may also perform an optional task 512 to obtain manual inspection data that can be used to supplement the sensor data obtained during task 510. The sensor data obtained during task 510, or a conditioned, concentrated, or processed version of the sensor data obtained during task 510, can then be processed to obtain an initial damage estimate (task 514). During task 514, process 500 may also process repair data such that the initial damage estimate is generated in response to the sensor data and the repair data. Process 500 may also generate the initial damage estimate in response to the manual inspection data.

The current damage estimate baseline associated with the particular sensor subsystem is subtracted from the initial damage estimate to obtain the intermediate damage estimate (task 516). A practical embodiment of SHM system 100 may employ other baseline adjustment techniques and different algorithms to generate intermediate damage estimates in response to initial damage estimates and baseline values. For example, damage estimation process 500 may process manual inspection data or other sensor data to generate the intermediate damage estimate. As described above, the intermediate damage estimate can serve as an input to a data fusion, trending, and tracking element that generates a final damage estimate for the given structural component.

Example Deployment—Composite Structure Monitoring

SHM system 100 can be deployed in a number of practical environments to monitor health of many different structural components. One practical deployment of SHM system 100 employs a network of Lamb wave transmitters and receivers to interrogate composite structures such as an aircraft fuselage around cargo door bays. The use of Lamb waves for nondestructive inspection is well known, and, therefore, the details of Lamb wave analysis are not presented herein.

There are two main classes of imperfections in continuous fiber composites: (1) manufacturing defects and (2) in-services damage accumulations. Manufacturing defects include processing generated anomalies such as delaminations, misorientation of fibers, resin-rich and resin-poor regions, incomplete or incorrectly cured matrix material, porosity and larger gas-generated voids. These manufacturing variances generally result in reduction in the composite mechanical properties and as such should be identified and controlled during the manufacturing process.

During usage, both incremental and discrete damage can accumulate. Fatigue (incremental) damage is characterized by initiation and growth of cracks from multiple sites near a high stress region. Although composites perform very well under cyclical loading, given the appropriate conditions matrix cracking can lead to fiber breakage, furthered by crack coupling, interfacial debonding, delamination growth and ultimate fracture.

Discrete damage can occur from the impact of an object onto the surface of the composite. Generally, the impact initiates a shock wave at the point of impact spreading as it travels and causes its largest effect below the surface. Thus, a small surface mark can presage a more significant subsurface damage state. In the past, surface abrasions and end ply section have provided a preferential path for water ingression and absorption by the matrix resins. For certain resins this leads to deterioration and reduced strength. SHM system 100 can eliminate or reduce the amount of manual maintenance inspections and repair actions by discerning damage evolution of the composite material.

Traditionally, ultrasound and X-ray techniques have been the principal methods used to nondestructively inspect composites. The most common ultrasonic approach is to employ a contact transducer to generate and collect bulk elastic waves that travel through the material thickness and reflect back from anomalies. In order to cover an area of interest, the transducer is either manually or automatically scanned over the area of concern.

A number of sensor/algorithm solution providers employ ultrasonic Lamb waves to interrogate composite structures. Lamb waves are guided elastic waves distinct from the bulk elastic waves used in the traditional ultrasonic approach. Lamb waves can travel in any direction perpendicular to the plate thickness direction, and as a consequence of the wave motion, cause small local material displacement throughout the plate's thickness. Schemes using distributed networks of sensors can be devised to examine the composite "plate" throughout its thickness over a given area without the need to reposition the Lamb wave transducers. This ability makes these elastic waves attractive for SHM system 100.

These large arrays of Lamb wave sensors are capable of generating huge amounts of data. In an avionics environment it is essential to compress this data into a form that can be used for analysis and storage. Generically, this is the process of feature extraction, where salient features of the data are deduced and consequently the data is compressed. These features, e.g., time of flight, signal amplitude, and signal "energy" (area under the rectified voltage curve), are then used in a model to predict the underlying damage state of the area traversed by the elastic waves.

Estimation of the composite damage requires modeling because it is very difficult to measure the damage directly. Thus, the damage is inferred from the data using either physical (first principal) models, data centric models, or a combination of the two approaches. Physics based models predict system behavior by examining the first principal relationship between the system stimulation and responses. Although a first principal approach may sound fundamentally more attractive, each of approaches has strengths and weaknesses. A pattern recognition approach improves as the quantity and quality of relevant data grows, while a first principal model improves as the sophistication of the model accounts for higher order and more subtle effects.

While at least one example embodiment has been presented in the foregoing detailed description, it should be appreciated that a vast number of variations exist. For example, although SHM system 100 can be configured to accommodate data collected from Lamb sensors, it is not so limited. Indeed, practical deployments of SHM system 100 can be customized to accommodate any number of different sensor subsystems and any number of different sensor types. It should also be appreciated that the described embodiment or embodiments are only examples, and are not intended to limit the scope, applicability, or configuration of the invention in any way. Rather, the foregoing detailed description will provide those skilled in the art with a convenient road map for implementing the example embodiment or embodiments. It should be understood that various changes can be made in the function and arrangement of elements without departing from the scope of the invention as set forth in the appended claims and the legal equivalents thereof.

What is claimed is:

1. A method for monitoring structural health of an apparatus, said method comprising:
   obtaining sensor data indicative of the structural integrity of a component of said apparatus;
   obtaining a feature baseline, said feature baseline reset upon a repair of said component;
   processing said sensor data and said feature baseline to obtain an initial damage estimate for said component;
   obtaining a damage estimate baseline, said damage estimate baseline determined independent of said repair of said component;
   generating a final damage estimate in response to said initial damage estimate and in response to said damage estimate baseline; and
   formatting said final damage estimate into at least one displayable damage representation.

2. A method according to claim 1, wherein generating said final damage estimate comprises subtracting said damage estimate baseline from said initial damage estimate.

3. A method according to claim 1, wherein said generating step generates said final damage estimate in response to said initial damage estimate, in response to said damage estimate baseline, and in response to manual inspection data for said component.

4. A method according to claim 1, further comprising:
   obtaining repair data for said component; and
   updating said damage estimate baseline in response to said repair data.

5. A method according to claim 4, wherein said processing step also processes said repair data to obtain said initial damage estimate for said component.

6. A method according to claim 1, further comprising:
   obtaining sensor repair data; and
   updating said damage estimate baseline in response to said sensor repair data.

7. A method according to claim 6, wherein said processing step also processes said sensor repair data to obtain said initial damage estimate for said component.

8. A method according to claim 1, wherein formatting said final damage estimate comprises processing allowable damage limits for said component.

9. A method according to claim 1, wherein:
   said apparatus is an aircraft; and
   said formatting step formats said final damage estimate for compatibility with aircraft maintenance systems.

10. A structure health monitoring system for an apparatus, said structure health monitoring system comprising:

means for obtaining sensor data indicative of the structural integrity of a component of said apparatus;

means for obtaining a feature baseline that is resetable upon a repair of said component;

means for processing said sensor data and said feature baseline to obtain an initial damage estimate for said component;

means for obtaining a damage estimate baseline determined independent of said repair of said component;

means for generating a final damage estimate in response to said initial damage estimate and in response to said damage estimate baseline; and means for formatting said final damage estimate into at least one displayable damage representation.

11. A system according to claim 10, wherein said means for generating subtracts said damage estimate baseline from said initial damage estimate.

12. A system according to claim 10, further comprising:

means for obtaining repair data for said component; and means for updating said damage estimate baseline in response to said repair data.

13. A system according to claim 10, further comprising:

means for obtaining sensor repair data; and means for updating said damage estimate baseline in response to said sensor repair data.

14. A system according to claim 10, wherein said means for processing also processes historical damage estimate data to obtain said initial damage estimate for said component.

15. A system according to claim 10, wherein:

said apparatus is an aircraft; and said means for formatting formats said final damage estimate for compatibility with aircraft maintenance systems.

16. A system according to claim 10, wherein:

said apparatus is a vehicle; and said means for obtaining, said means for processing, said means for generating, and said means for formatting are onboard said vehicle.

* * * * *